US011541648B2

(12) United States Patent
Zhang et al.

(10) Patent No.: US 11,541,648 B2
(45) Date of Patent: Jan. 3, 2023

(54) VACNT-BASED FLEXIBLE ELECTRONICS FOR SENSING AND CAPACITANCE APPLICATIONS

(71) Applicant: THE TRUSTEES OF THE STEVENS INSTITUTE OF TECHNOLOGY, Hoboken, NJ (US)

(72) Inventors: Runzhi Zhang, Hoboken, NJ (US); Eui-Hyeok Yang, Fort Lee, NJ (US)

(73) Assignee: THE TRUSTEES OF THE STEVENS INSTITUTE OF TECHNOLOGY, Hoboken, NJ (US)

( * ) Notice: Subject to any disclaimer, the term of this patent is extended or adjusted under 35 U.S.C. 154(b) by 701 days.

(21) Appl. No.: 16/541,054

(22) Filed: Aug. 14, 2019

(65) Prior Publication Data

US 2020/0001587 A1 Jan. 2, 2020

Related U.S. Application Data

(63) Continuation-in-part of application No. PCT/US2018/030744, filed on May 2, 2018.

(Continued)

(51) Int. Cl.
*B32B 37/00* (2006.01)
*H01G 11/26* (2013.01)
(Continued)

(52) U.S. Cl.
CPC ............ *B32B 37/025* (2013.01); *B32B 37/14* (2013.01); *B32B 38/10* (2013.01); *G01L 9/0051* (2013.01);
(Continued)

(58) Field of Classification Search
CPC ....... B32B 37/025; B32B 38/10; H01G 11/26; H01G 11/36; H01G 11/54; H01G 11/56;
(Continued)

(56) References Cited

U.S. PATENT DOCUMENTS 8,685,287 B2 * 4/2014 Worsley ................. C01B 32/00
977/932
10,224,153 B2   3/2019 Yin et al.
(Continued)

OTHER PUBLICATIONS

International Preliminary Report on Patentability dated Nov. 14, 2019 in PCT/US2018/030744. (7 pages).
(Continued)

*Primary Examiner* — Sonya M Sengupta
(74) *Attorney, Agent, or Firm* — Lewis Roca Rothgerber Christie LLP (57) ABSTRACT

Flexible and stretchable electronics, including supercapacitors and pressure sensors, are made using carbon nanostructures produced by providing a first composite structure which includes a temporary substrate and an array of carbon nanotubes arranged in a stack on a surface of the temporary substrate such that the stack of carbon nanotubes is oriented generally perpendicular to the surface of the temporary substrate, which may include silicon dioxide. The stack of carbon nanotubes is transferred from the temporary substrate to another substrate, which includes a curable polymer, thereby forming another composite structure comprising the stack of carbon nanotubes and the cured polymer.

19 Claims, 6 Drawing Sheets

Related U.S. Application Data (60) Provisional application No. 62/718,880, filed on Aug. 14, 2018, provisional application No. 62/500,041, filed on May 2, 2017.

(51) Int. Cl.
*H01G 11/86* (2013.01)
*B32B 38/10* (2006.01)
*G01L 9/00* (2006.01)
*H01G 11/36* (2013.01)
*H01G 11/54* (2013.01)
*B32B 37/14* (2006.01)

(52) U.S. Cl.
CPC ............ *H01G 11/26* (2013.01); *H01G 11/36* (2013.01); *H01G 11/86* (2013.01); *H01G 11/54* (2013.01)

(58) Field of Classification Search
CPC ........ H01G 11/58; H01G 11/08; G01L 1/142; G01L 9/0051; B82Y 15/00; B82Y 30/00; B82Y 40/00; Y10S 977/75; Y10S 977/752; Y10S 977/948; Y10S 977/953; Y10S 977/962
See application file for complete search history.

(56) References Cited

U.S. PATENT DOCUMENTS

| 2008/0170982 | A1* | 7/2008 | Zhang | H01L 51/444 423/447.3 |
| 2010/0140591 | A1* | 6/2010 | Nicholas | B82Y 10/00 257/40 |
| 2010/0304101 | A1 | 12/2010 | Lin et al. | |
| 2011/0204020 | A1 | 8/2011 | Ray et al. | |
| 2012/0121986 | A1 | 5/2012 | Balu et al. | |
| 2015/0098167 | A1* | 4/2015 | El-Kady | H01G 11/26 361/502 |
| 2016/0033343 | A1* | 2/2016 | Park | G01L 1/146 73/862.046 |
| 2019/0002284 | A1 | 1/2019 | Inoue et al. | |

OTHER PUBLICATIONS

Written Opinion of the International Searching Authority dated Jul. 11, 2018 in PCT/US2018/030744. (5 pages).
International Search Report dated Jul. 11, 2018 in PCT/US2018/030744. (2 pages).
U.S. Appl. No. 16/610,066, filed Oct. 31, 2019. (16 pages).

* cited by examiner

1. VACNT growth

FIG. 1A

2. VACNT transfer

FIG. 1B

3. VACNT delamination

VACNT-BASED FLEXIBLE ELECTRONICS FOR SENSING AND CAPACITANCE APPLICATIONS

CROSS-REFERENCE TO RELATED APPLICATION

The present application claims the benefit of U.S. Provisional Patent Application Ser. No. 62/718,880 filed Aug. 14, 2018, and is a continuation-in-part of PCT Application No. PCT/US18/30744 filed May 2, 2018 which designates the United States and which claims the benefit of U.S. Provisional Application Ser. No. 62/500,041 filed May 2, 2017, the entire disclosures of which applications are incorporated herein by reference.

STATEMENT REGARDING FEDERALLY SPONSORED RESEARCH

None.

FIELD OF THE INVENTION

The present invention relates to the field of electronics made from carbon nanostructures that are robust under conditions such as bending and stretching. More specifically, the present invention relates to the field of supercapacitors and methods of making supercapacitors, as well as sensors capable of stable pressure measurement under changing environmental conditions, that mimic human skin and are substantially unaffected by deformation.

BACKGROUND OF THE INVENTION

Flexible electronics have a wide range of applications in wearable and multifunctional electronics, including flexible displays, electronic skins, and implantable medical devices. Flexible supercapacitors, with good mechanical compliance, can meet the requirements for light-weight, portable and flexible devices.

The increasing depletion of fossil fuels and the environmental problems caused by those fossil fuels have motivated researchers to develop new types of clean energy, such as solar, wind, and water energy. As these new energy sources are limited by time or location (water, wind, and solar power), energy storage devices are required to ensure continued power supply. Supercapacitors, as one type of energy storage device, have received intensive attention owing to their high power density, fast charge/discharge, and long charge/discharge cycles.

Carbon nanotubes are a promising electrode material for flexible supercapacitors owing to their excellent properties. However, the fabrication of flexible supercapacitors in large quantities can be a complicated process. For example, to apply electrode materials onto flexible substrates, researchers have used direct-coating methods which rely heavily relies on the physical adhesion of the electrode materials on the substrate, or stacking the electrode and electrolyte. It has been found, however, that the electrode/substrate interface resulting from such fabrication methods can delaminate under large strain, thereby limiting the flexibility of the supercapacitors produced thereby and consequently deteriorating their performance.

Fabrication of flexible electronics is also desirable in the field of innovation encompassing the creation of electronic skin, which has the object of creating sensors that mimic human or animal skin by responding to environmental factors such as changes in heat and pressure. Electronic skin can facilitate advances in intelligent robotics, human machine interactions, soft robotics, health monitoring and biomimetic prosthesis, while also bearing heavily on the advancement of artificial intelligence systems. A conventional challenge has been maintaining the robustness of the material against mechanical strain while also maintaining its sensing ability.

Typically, sensitive and spatially accurate pressure sensors can be achieved through conformal contact with the surface; however, for e-skin applications, this would make them simultaneously sensitive to mechanical deformation (bending) of the substrate (e.g., skin). In this case, the measurement of the pressure orthogonal to the sensor skin under dynamic deformation of the substrate can significantly affect the sensor output as a result of the lateral strains induced by mechanical deformation (such as stretching, bending, twisting and wrinkling of the substrate).

SUMMARY OF THE INVENTION

In one embodiment, a method according to the present invention enables the facile fabrication of flexible supercapacitors using polydimethylsiloxane (PDMS) to infiltrate between an array of carbon nanotubes, thereby achieving strong adhesion between the PDMS and the vertically aligned carbon nanotubes (VACNTs) due to the viscoelastic property of PDMS which promotes the adhesion between the VACNTs and PDMS. In accordance with this embodiment, the present invention enables facile fabrication of flexible supercapacitors at a high rate of throughput.

In accordance with another embodiment of the present invention, a flexible and stretchable supercapacitor includes VACNTs in a curable polymer (e.g., PDMS), with the VACNTs/PDMS composite structure functioning as an electrode for flexible supercapacitors. After assembling the electrode with liquid or solid electrolyte, the flexible supercapacitors, acting as energy storage devices, can be integrated into flexible electronics. In such applications of the present invention, the VACNTs/PDMS composite structures produced in accordance with the present invention maintain their structural integrity under tensile strains over 1000 charge/discharge cycles without major degradation of their functionality.

In another embodiment of the present invention, pressure sensors that maintain a high degree of fidelity under stretching and bending conditions can be made by incorporating vertically-aligned carbon nanotubes (VACNT) on a curable polymer such as PDMS (polydimethylsiloxane). The pressure can be determined by monitoring the change in resistance that occurs when orthogonal pressure forces contact between the VACNTs on the two different PDMS substrates.

In accordance with one implementation of the present invention, a real-time pressure mapping system can be created. The real-time pressure mapping system comprises thin, regularly microstructured carbon nanotube arrays that enable the device to function with a desired pressure sensitivity and a rapid response time. The array is enabled by the carbon nanotubes, which can be fabricated using a process similar to what is described below, using photolithography and masks. The fabrication steps include depositing catalysts on the patterned area using physical vapor deposition and growing carbon nanotubes in a desired pattern with chemical vapor deposition. The transfer and integration steps are the same as for the single sensor embodiment described below. The sensor array pattern can be circular, square, or any other desired shape.

The pressure sensor array permits users to select a precise location where the collection of surface pressure mapping is required. The sensor array collects data from many separate elements simultaneously, which will maintain the data accuracy at desired locations and will improve efficiency. Such a sensor array shares the properties of pressure sensitivity and response time with the single sensor embodiment described below.

The sensor arrays may be fabricated using patterned carbon nanotubes and a built-in electrical circuit for wireless measurement. Each sensor element can be connected in parallel and connected to a standard Arduino Uno circuit board. The Arduino microcontroller works in tandem with the internal circuitry to receive current or resistance signals. C-code can be utilized in Arduino to measure the real-time resistance of each sensor element as strain is being applied to each sensor individually and to process the data. In an embodiment, the microcontroller can then send the data to an external computer configured to control the microcontroller and monitor it in real-time. The sensors can be applied to wearable electronic devices that could be placed on skin. A wireless or Bluetooth connection may be used to implement the connection to the wearables in order to improve their ease of use and communication to other optional devices on the wearables.

BRIEF DESCRIPTION OF THE FIGURES

For a better understanding of the present invention, reference is made to the following detailed description of various exemplary embodiments considered in conjunction with the accompanying Figures, in which like structures are referred to by the like reference numerals throughout the several Figures, and in which:

FIGS. 3A-3D represent a group of charts illustrating an electrochemical characterization of a VACNTs/PDMS stack under tensile strain and bending, and more particularly, showing.

DETAILED DESCRIPTION OF THE EXEMPLARY EMBODIMENTS

Figure 1A:
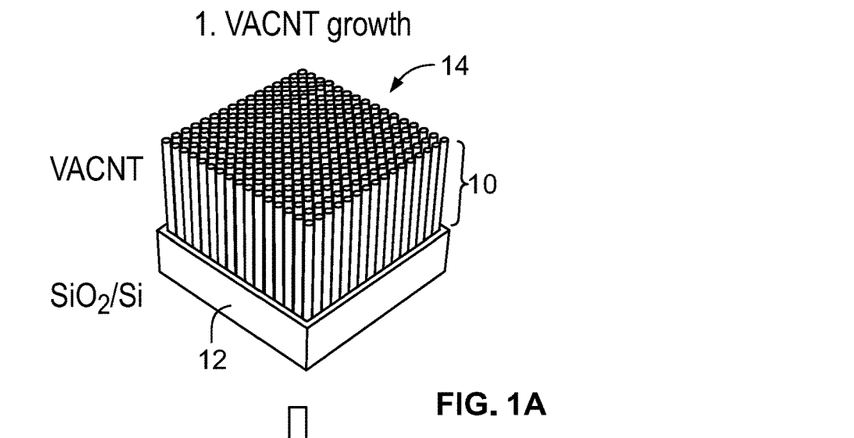
FIGS. 1A-1C represent a sequence of schematic illustrations depicting one example of a process that can be employed to construct a VACNT/PDMS stack for use in flexible supercapacitors fabricated according to an embodiment of the present invention.
Figure 1B:
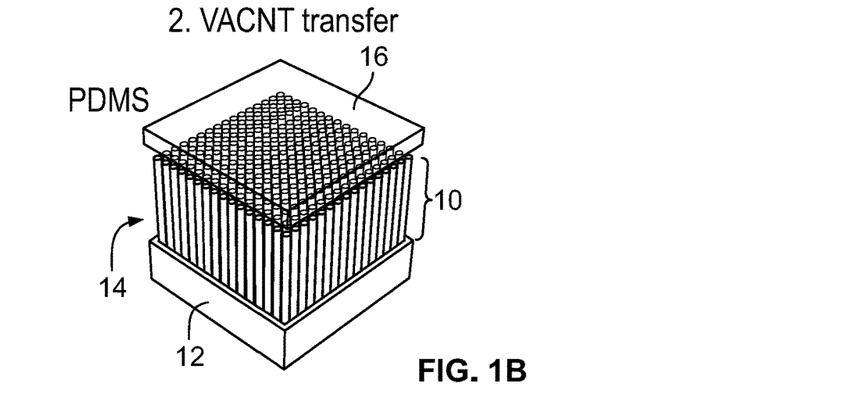
Figure 1C:
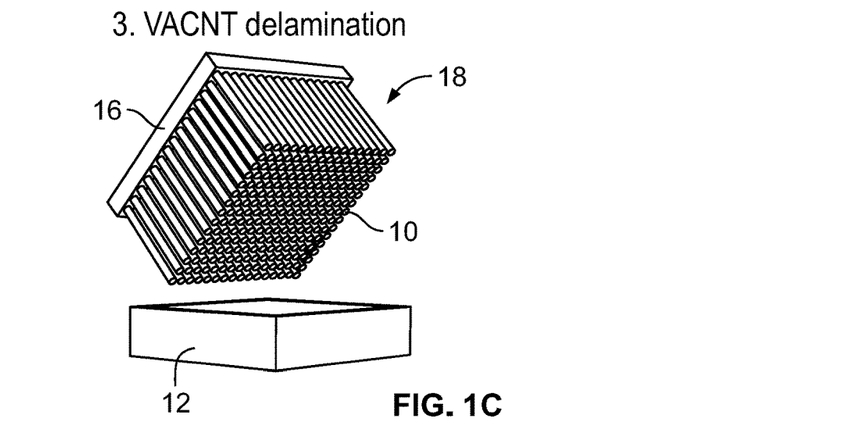
Figure 2A:
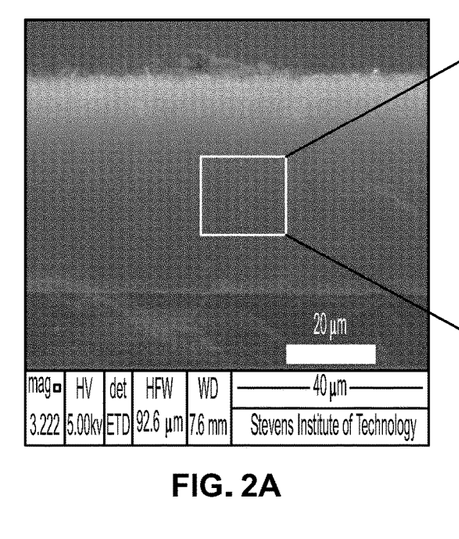
FIGS. 2A-2D represent a set of SEM images of CVD-grown VACNTs on a silicon dioxide ($SiO_2$) substrate (see FIG. 2A and FIG. 2B, and VACNTs successfully transferred on PDMS (see FIG. 2C and FIG. 2D, in which the structure shown in the SEM images was obtained by delaminating the VACNT/PDMS stack from the $SiO_2$ substrate during a fabrication process according to an embodiment of the present invention.
Figure 2B:
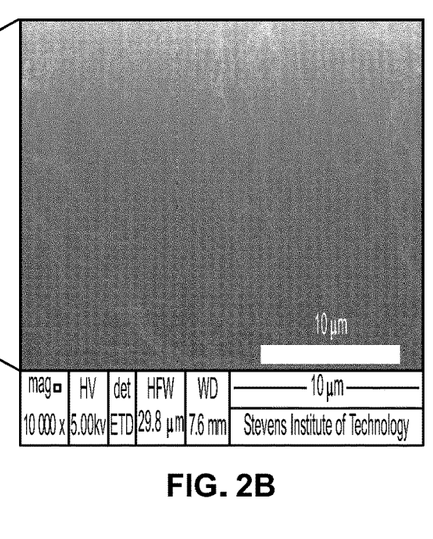
Figure 2C:
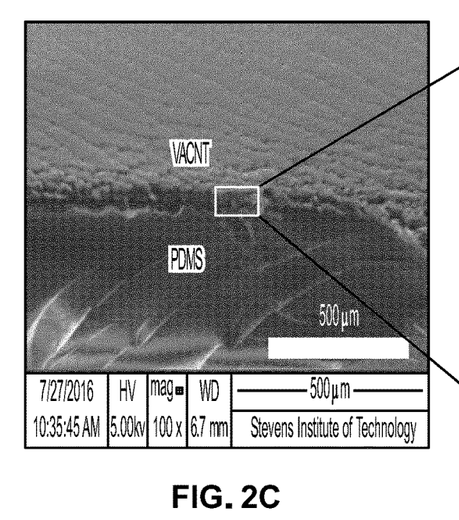
Figure 2D:
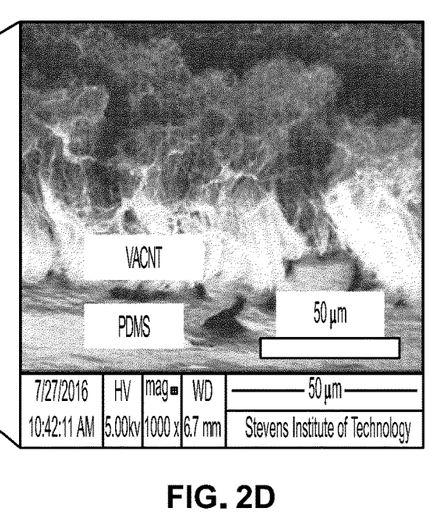

With initial and general reference to FIGS. 1-3 and the accompanying text which follows, it is noted that terms indicating position, orientation or direction of motion are used throughout the discussion of FIGS. 1-3 for the purpose of facilitating discussion only, and not to limit the disclosed embodiments to the particular terms described herein. Nor do they limit the physical orientation in actual use to any particular coordinate system (e.g., horizontal, vertical and front, back and side).

It should also be noted that the following disclosure is presented to provide an illustration of the general principles of the present invention and is not meant to limit, in any way, the inventive concepts disclosed and claimed herein. All terms defined herein should be afforded their broadest possible interpretation, including any implied meanings as dictated by a reading of the specification as well as any words that a person having skill in the art and/or a dictionary, treatise, or similar authority would assign thereto.

Further, it should be noted that, as recited herein, the singular forms "a", "an", and "the" include the plural referents unless otherwise stated. Additionally, the terms "comprises", "comprising", "includes", "including", "has" and the like, when used herein specify that certain features are present in that embodiment, however, such terms should not be interpreted to preclude the presence or addition of additional steps, operations, features, components, and/or groups thereof.

With the foregoing prefatory comments in mind, embodiments of the present invention include a facile fabrication method utilizing VACNT carpets. Such a method enables high-throughput fabrication of supercapacitors that are flexible and stretchable. The inventive method provides a strong adhesion between VACNT carpets and PDMS, which facilitates a stable charge/discharge cycle under various tensile strain conditions. Such performance characteristics enhance the practicality of including the VACNTs/PDMS structures of the present invention in flexible supercapacitors. The VACNTs/PDMS structures possess a very high surface area, which contributes to the unexpectedly high capacitance of the flexible supercapacitors produced in accordance with the present invention.

Referring initially to FIGS. 1A-1C, the first step of an exemplary embodiment of a fabrication method according to the present invention involves growing a dense carpet-like structure of VACNTs 10 on a wafer-like $SiO_2$/Si substrate 12 using atmospheric pressure chemical vapor deposition (APCVD). More particularly, the $SiO_2$/Si substrate 12 illustrated schematically in FIGS. 1A-1C is a $SiO_2$/Si wafer with 5 nm thick Al and 3 nm thick Fe as catalyst deposited on its surface by physical vapor deposition (PVD). After placing the $SiO_2$/Si substrate 12 in an APCVD chamber (not shown), its furnace temperature is increased to 750° C. with 500 sccm Ar flow. VACNTs are grown in the APCVD chamber at 750° C. for 15 minutes with 60 sccm $H_2$ and 100 sccm $C_2H_4$. The APCVD chamber is then cooled down to room temperature while keeping the Ar flowing. The resulting dense carpet-like structure of VACNTs 10 (see FIGS. 2A-2D formed by this exemplary method are aligned generally vertically relative to the surface of the $SiO_2$/Si substrate 12, which substrate 12 is considered for the purpose of the present example to be horizontal, thereby forming a composite structure 14 consisting essentially of the carpet-like structure of VACNTs 10 and the $SiO_2$/Si substrate 12. In embodiments of the present invention, other methods of forming VACNTs may be used in place of the exemplary method discussed above.

The next step of the exemplary method is to transfer the carpet-like structure of VACNTs 10 onto PDMS or another polymer before the polymer fully cures. To form a suitable PDMS structure 16, a PDMS base and a suitable curing agent (e.g., Sylgard 184 Silicone Elastomer, Dow Corning) are mixed in a ratio of 10:1 (PDMS base:curing agent), and degassed under reduced pressure in a vacuum pump to remove bubbles from the liquid mixture. The liquid mixture is then heated on a hot plate at 65° C. for about 30 minutes. The previously formed composite structure 14 (i.e., the carpet-like structure of VACNTs 10 and the $SiO_2$/Si substrate 12) is placed face-to-face onto the PDMS structure 16 before the PDMS is fully cured. Once the PDMS is fully cured, the result is a VACNTs/PDMS composite structure 18 that can be peeled off (i.e., delaminated) from the $SiO_2$/Si substrate 12.

In embodiments of the present invention, the VACNTs/PDMS composite structure 18 functions as an electrode for flexible supercapacitors, with the electrolyte for such flexible supercapacitors being either an ionic-liquid or a solid. In an exemplary embodiment of the present invention, a solid electrolyte can be fabricated by mixing polyvinyl alcohol powder and potassium hydroxide (KOH) in deionized water, while also evaporating the excess water to obtain a gel electrolyte. To create all-solid-state flexible supercapacitors according to embodiments of the present invention, the gel electrolyte is sandwiched between a pair of the VACNTs/PDMS composite structures 18.

Referring to FIGS. 3A-3D, the electrochemical properties of the VACNTs/PDMS composite structures 18 made using methods according to the present invention were measured in 30% KOH using cyclic voltammetry (CV) in a three electrode configuration. Platinum (Pt) foil was used as a counter electrode and Ag/AgCl (saturated KCl) as the reference electrode. CV measurements were performed within the potential range of 0.0V-0.5V at scan rates of 50-1000 mV/s. The capacitances of the electrodes were calculated as a capacitance per area (F/cm$^2$). The average capacitance was normalized per area of the samples and was estimated according to the following equation.

$$C = \frac{\int_{E_1}^{E_2} I\, dV}{V \times \Delta V \times A}$$

where I is the current, A is the area of the supercapacitor, $\Delta V$ is the scanning rate, $E_1$ and $E_2$ are the voltage and $V=E_2-E_1$.

Figure 3A:
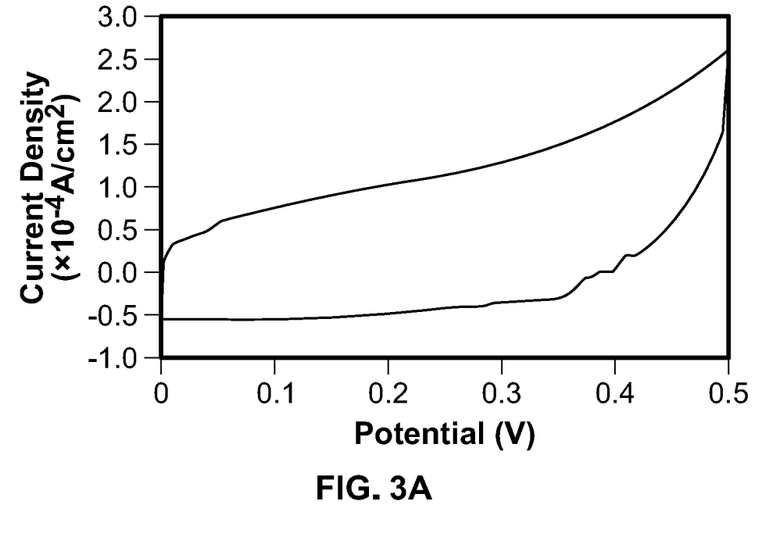
in FIG. 3A, a chart of cyclic voltammetry data at a scan rate of 1 V/s.
Figure 3B:
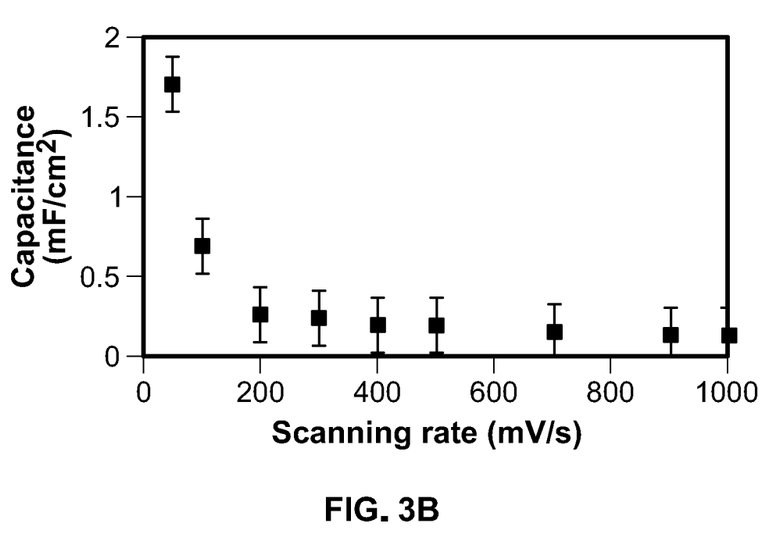
in FIG. 3B, a chart of capacitances at scan rates ranging from 50 mV/s to 1 V/s.
Figure 3C:
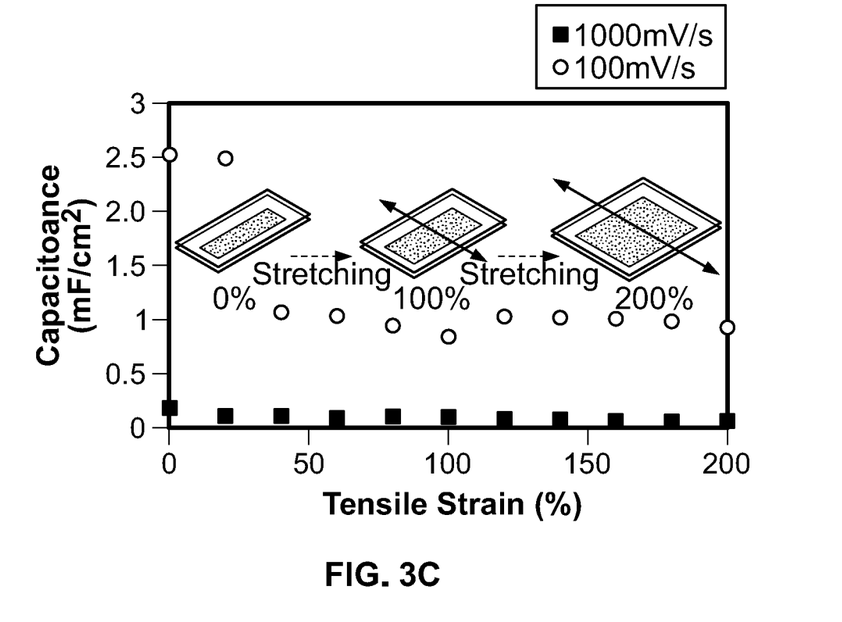
in FIG. 3C, a chart of capacitances under strains of up to 200% at the scan rates of 100 mV/s and 1 V/s; and in FIG. 3D, a chart of capacitances under bending, the angles of bending ranging from 0 to 180 degrees.
Figure 3D:
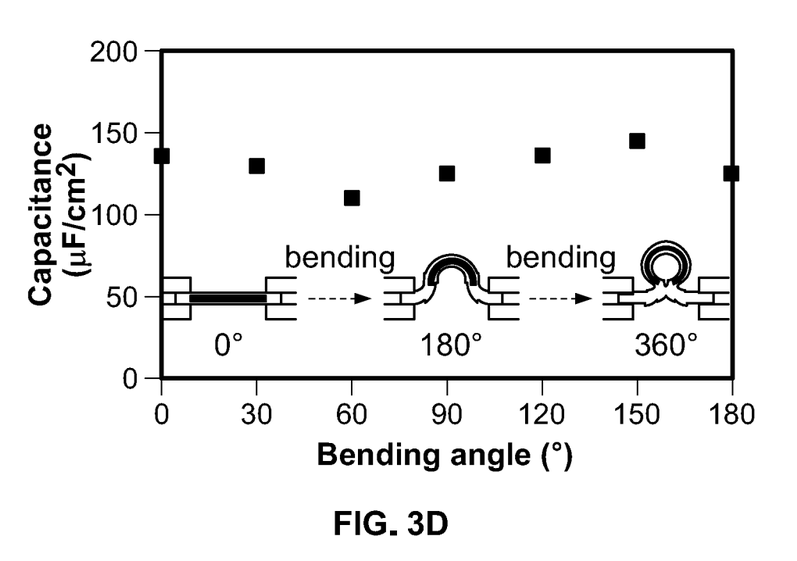

To evaluate the flexibility and durability of the VACNTs/PDMS composite structures 18, both tensile strain measurements and bending strain measurements were performed. Such measurements were made as the VACNTs/PDMS composite structures 18 were stretched from 0% to 20% and bent from 0 to 180 degrees.

The VACNTs/PDMS composite structures 18 exhibited good electrochemical stability and capacitive behaviors at scanning rates from 50 mV/s to 1 V/s. The measured capacitance (see FIG. 3A and FIG. 3B), which has an area of 0.54 cm$^2$, was approximately 170 pF/cm$^2$ at a high scan rate of 1V/s. In addition, the strong adhesion between the VACNTs and the PDMS enabled the VACNTs/PDMS structures 18 to sustain various bending and tensile strains (see FIG. 3C and FIG. 3D). The VACNTs/PDMS composite structures 18 could be bent up to 180 degrees, and the capacitance under such strains was consistent under bending angles in the range of 0 to 180 degrees. The maximum tensile strain was 200% (see FIG. 3C). Further tests have demonstrated that the capacitance of the VACNTs/PDMS composite structures 18 can remain consistent under tensile strains of at least 300%.

Flexible supercapacitors that include the VACNTs/PDMS composite structures 18 made using methods according to embodiments of the present invention are expected to have applications in, for example, the fields of wearable electronics, flexible photovoltaics (e.g., rolled-up displays), self-powered wearable optoelectronics, and electronic skins.

In another embodiment of the present invention, manufacturing techniques similar to those described hereinabove can be used to make robust, flexible sensors (e.g., pressure sensors).

In accordance with one embodiment, making a flexible pressure sensor from VACNTs on PDMS substrates results in a sensor capable of detecting pressure applied orthogonally to its surface. The unique scheme of the carbon nanotube (CNT) arrangement renders the sensor substantially unaffected by lateral strain, including stretching and bending of the substrates. To achieve these properties, the VACNTs should be interwoven so that they comprise wavy nanotubes which are individually entangled with each other and mechanically cross-linked. When mechanical strains are applied (i.e., stretching and bending), the individual VACNTs remain entangled during the lateral expansion of the nanotube network, thereby maintaining their mechanical and electrical integrity.

Figure 4A:
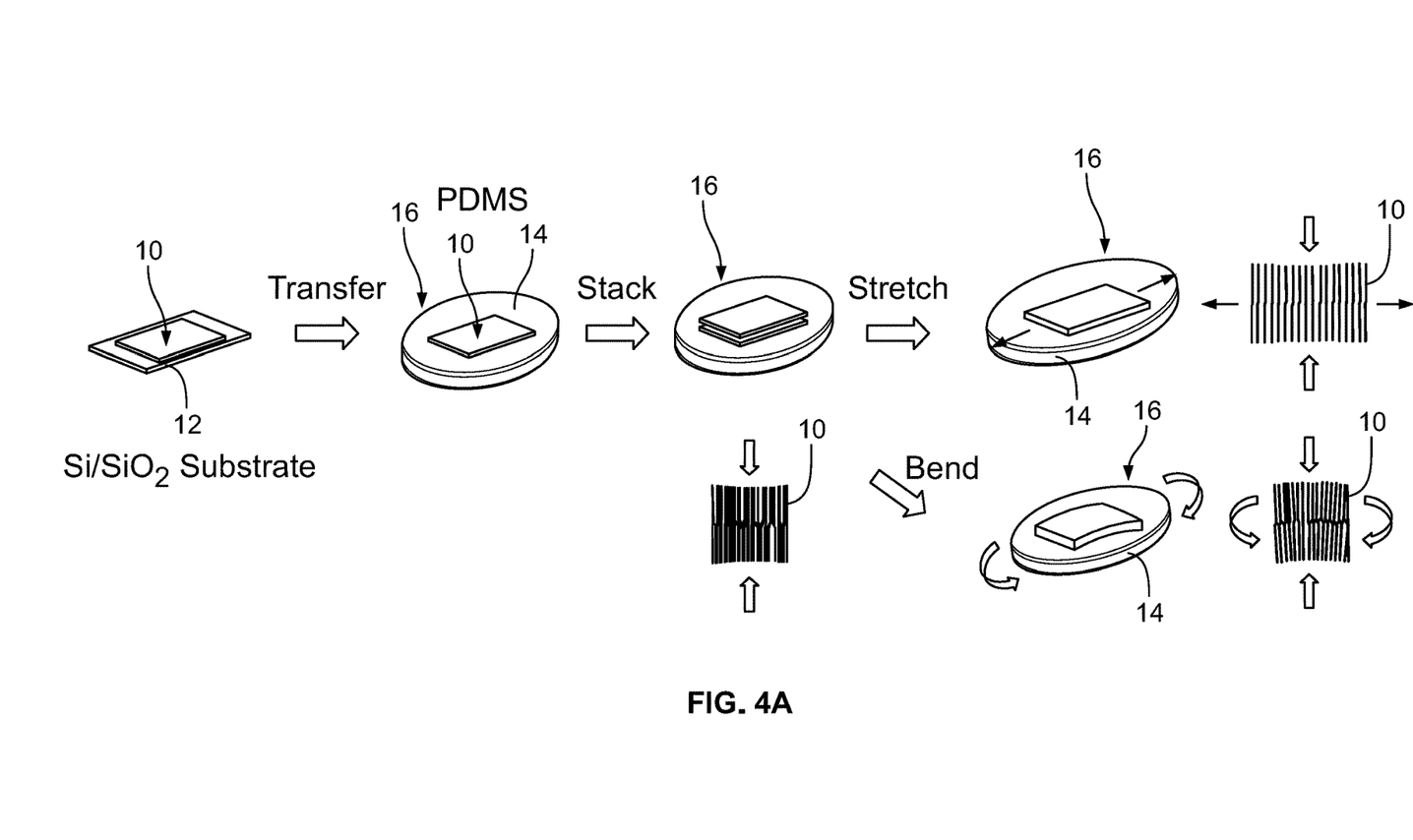
FIG. 4A is a series of three schematic illustrations of the fabrication procedure for a sensor constructed in accordance with the present invention, including illustrations of stretching and bending tests after the "Stretch" arrow and "Bend" arrow, respectively.

The flexible pressure sensor operates via a variation in resistance induced by a change in the levels of contact between VACNT layers on differing PDMS substrates as pressure is applied. Numerous tiny contacts between upper and lower carbon nanotubes enable this mechanical sensing. When a deformation is induced by an external pressure (orthogonally applied to the surface), the numerous nanotube-to-nanotube contacts between two VACNT-PDMS structures will increase proportional to the applied pressure. When this occurs, it facilitates a decrease in resistance (R) according to the equation $$R = \frac{\rho L}{A}$$

where $\rho$ is the resistivity, L is the length of the material, and A is the cross-sectional area. Thus, an accurate measurement of external pressure orthogonally applied to the surface is enabled. By stacking two VACNT-PDMS structures face-to-face such that the two VACNT carpets are sandwiched between their respective PDMS structures, increased contact of the CNT layers proportional to the applied pressure is achieved (see the third sequential illustration in FIG. 4A, the one between the "Stack" and "Stretch" arrows, and the underlying schematic illustration of two VACNT carpets and two pressure arrows).

The VACNT-PDMS structure is highly flexible and stretchy, and maintains the stable electrical conductivity under varied lateral strains at a constant vertical pressure, since the carbon nanotubes are interwoven and entangled with each other. This property results from the fabrication procedure, which enables strong bonding between the CNTs and the PDMS because the tips of the CNTs are embedded into the PDMS during the transfer process. When a mechanical deformation is applied to the flexible substrate, the distance between each carbon nanotube changes along with the distortion of the PDMS, without modifying the interwoven and entangled VACNT structure responsible for maintaining stable electrical conductivity.

Figure 4B:
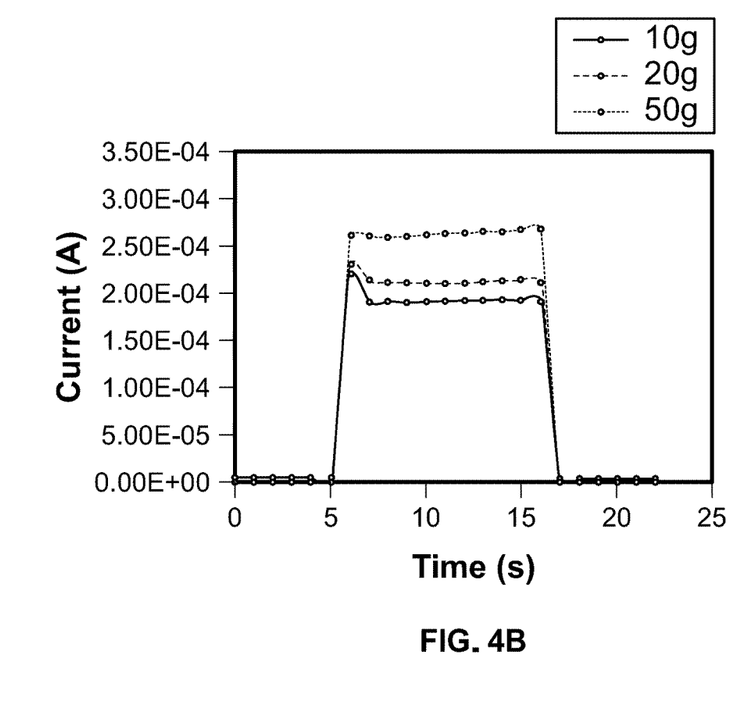
FIG. 4B is a graph that shows the current (A) output as a sensor constructed in accordance with the present invention is loaded and unloaded over time.
Figure 4C:
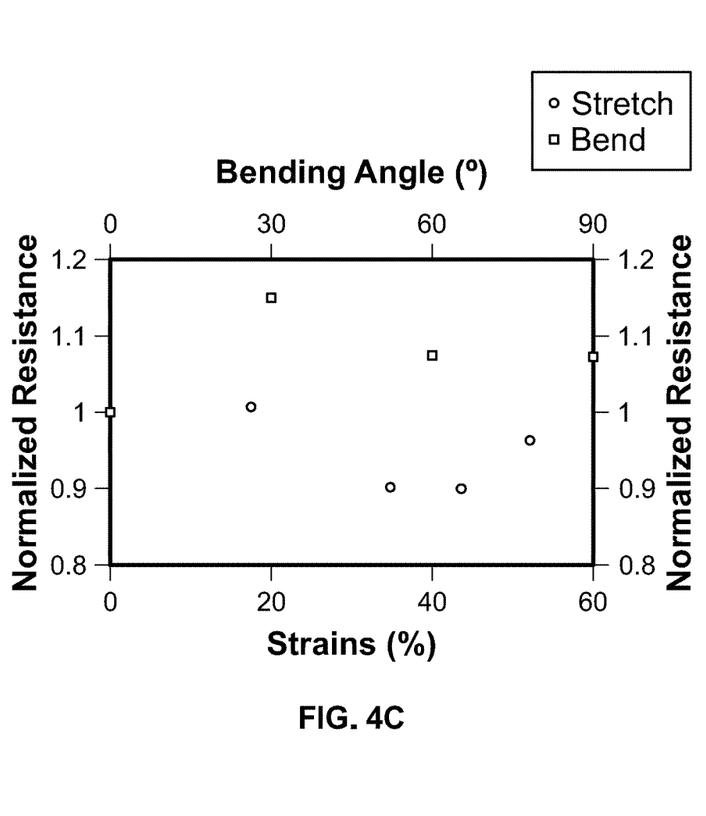
FIG. 4C is a graph that shows variations in resistance as a sensor constructed in accordance with the present invention is bent and stretched.

Schematics of the fabrication procedure and illustration of stretching and bending tests (see the schematics to the right of the "Stretch" and "Bend" arrows) are shown in FIG. 4A. To characterize the pressure sensor, varying pressure values were applied to the sensor (the pressures being, in one example, 1.03 kPa, 1.37 kPa, and 1.82 kPa, respectively). The change of current during loading and unloading is shown in FIG. 4B. In addition, various stretching and bending strains were applied to the VACNT-PDMS substrate. The substrate of the pressure sensor was laterally stretched to 200% and bent up to 180° under a constant pressure applied vertically against the substrate, demonstrating consistent resistance up to 50% stretching and 180° bending as shown in FIG. 4C.

To fabricate the exemplary sensor, first a plurality of VACNTs 10 are grown on a silicon wafer substrate 12 using atmospheric pressure chemical vapor deposition (APCVD). The silicon wafer substrate 12 with, for example, 5 nm aluminum and 3 nm iron as catalysts deposited on its surface is prepared by physical vapor deposition (PVD). Next, the substrate 12 is placed in an atmosphere pressure chemical vapor deposition (APCVD) chamber. In one embodiment, the furnace temperature is increased to 750° C. with 500 sccm argon flow. By way of example, the VACNTs 10 are grown at 750° C. for 15 minutes with 60 sccm $H_2$ and 100 $C_2H_4$. The chamber is then cooled down to room temperature while keeping the argon flowing. These parameters affect the thickness of the VACNTs. The thickness of the VACNTs may affect the sensitivity of the pressure sensor as well as how insensitive the sensor is to strains (i.e., the strain threshold over which the sensor is no longer insensitive to stretching and/or bending).

The second step (see the second sequential illustration in FIG. 4A, the one between the "Transfer" and "Stack" arrows) is to transfer the VACNTs 10 from the silicon wafer substrate 12 (see the first sequential illustration in FIG. 4A, the one before the "Transfer" arrow) onto a partially cured PDMS substrate 14. To form the PDMS substrate 14, a liquid mixture of PDMS base and curing agent (which in one embodiment is Sylgard 184 Silicone Elastomer, Dow Corning) are mixed with a ratio, which can be, for example, 10:1, and degassed under reduced pressure in a vacuum pump to remove bubbles. Then the liquid PDMS is, in one embodiment, heated on a hot plate at 65° C. for about 30 minutes before it is fully cured. These parameters may be varied as long as the PDMS is partially cured. For instance, lower heating temperatures will result in a longer required heating time to partially cure the PDMS, which will turn out softer. The curing condition of PDMS is optimized, where the partially cured PDMS is tacky, but not fully wet. The VACNTs 10 are then gently placed onto the partially cured PDMS and the tips of CNTs are partially immersed into the PDMS, while it is still in liquid form. Any bubbles in the PDMS should be avoided, as well as any shift in the alignment of the CNTs in the PDMS. During the curing process, the embedded CNTs are eventually wetted by PDMS and the silicon wafer substrate 12 is successfully peeled off from the VACNT-PDMS structure 16 after the PDMS is fully cured. The entire fabrication process allows a rapid and facile fabrication and integration of the VACNT-PDMS substrate 16. The individual VACNT structures are vertically aligned in general, but interwoven at an individual level, a property that exists due to the aforementioned growth step and is preserved through the transfer step. Therefore, the VACNT-PDMS structure 16 can still have a good electrical conductivity under stretching/bending deformations.

After stacking the VACNT-PDMS structure 16 in a face-to-face manner with another VACNT-PDMS structure (see the third sequential illustration in FIG. 4A, the one between the "Stack" and "Stretch" arrows), a deformation can be induced by an external pressure, and the interconnection between carbon nanotubes can be converted into different resistance signals. It should be noted that FIG. 4A, for the sake of visual clarity, omits the topmost PDMS layer from the upper VACNT-PDMS structure 16 of the stacked VACNT-PDMS structures in the pertinent illustrations.

It will be understood that the embodiments of the present invention described herein are merely exemplary and that a person skilled in the art may make many variations and modifications without departing from the spirit and scope of the invention. All such variations and modifications are intended to be included within the scope of the invention, as defined in the following claims.

The invention claimed is:

1. A method of fabricating a carbon nanotube structure, comprising the steps of:
   providing a first composite structure which includes a first substrate and an array of carbon nanotubes arranged in a stack on a surface of said first substrate such that said stack of carbon nanotubes is oriented generally perpendicular to said surface of said first substrate and such that each of said carbon nanotubes has a first end embedded in said first substrate and a second end distal to said first substrate;
   providing a second substrate which includes a curable precursor of a polymer;
   partially curing said precursor to form a partially cured polymer;
   placing said stack of carbon nanotubes into contact with said second substrate such that said second end of each of said carbon nanotubes is partially embedded in said second substrate before said partially cured polymer is fully cured;
   fully curing said partially cured polymer to form a fully cured polymer while said second end of each of said carbon nanotubes is partially embedded in said second substrate, whereby a second composite structure is formed which includes said first substrate, said second substrate and said stack of carbon nanotubes between said first and second substrates; and
   delaminating said first substrate from said stack of carbon nanotubes to thereby form a third composite structure which includes said stack of carbon nanotubes and said second substrate.

2. The method of claim 1, wherein said first substrate includes silicon.

3. The method of claim 1, wherein said first substrate includes silicon dioxide.

4. The method of claim 1, wherein said first substrate has a wafer-like structure made from silicon or silicon dioxide.

5. The method of claim 4, wherein said wafer-like structure includes a catalyst which is applied thereto by physical vapor deposition.

6. The method of claim 4, wherein said catalyst is selected from the group consisting of aluminum and iron.

7. The method of claim 1, wherein said stack of carbon nanotubes is grown on said first substrate in an atmospheric pressure chemical vapor deposition chamber.

8. The method of claim 7, wherein said stack of carbon nanotubes is grown at a temperature of 750° C. for 15 minutes.

9. The method of claim 8, wherein said stack of carbon nanotubes is grown into a dense carpet-like structure.

10. The method of claim 9, wherein said second substrate further comprises a curing agent for said precursor.

11. The method of claim 10, wherein said polymer is polydimethylsiloxane and said curing agent is a silicone elastomer.

12. The method of claim 10, wherein said polymer has viscoelastic properties.

13. The method of claim 1, wherein said polymer, once fully cured, adheres to said second ends of said carbon nanotubes.

14. The method of claim 1, wherein said partially cured polymer of said second substrate is tacky, but not fully wet, when said stack of carbon nanotubes is placed into contact with said second substrate.

15. The method of claim 1, further comprising the step of stacking said carbon nanotube structure face-to-face with another carbon nanotube structure to form a flexible pressure sensor.

16. The method of claim 1, wherein said array of carbon nanotubes is provided by growing a plurality of carbon nanotubes in thin, regularly microstructure arrays to form a plurality of discrete sensor elements in a desired pattern.

17. The method of claim 16, wherein said microstructure arrays are grown using photolithography and masks.

18. The method of claim 16, further comprising the step of integrating electronic components in said plurality of discrete sensor elements.

19. A flexible pressure sensor made in accordance with the method of claim 15.

* * * * *